United States Patent
Choi

(10) Patent No.: US 8,186,016 B2
(45) Date of Patent: May 29, 2012

(54) HINGE DEVICE FOR MOBILE DEVICE OF FOLDING TYPE

(75) Inventor: Se-Bum Choi, Seoul (KR)

(73) Assignee: Prexco Co., Ltd. (KR)

( * ) Notice: Subject to any disclaimer, the term of this patent is extended or adjusted under 35 U.S.C. 154(b) by 274 days.

(21) Appl. No.: 12/653,083

(22) Filed: Dec. 8, 2009

(65) Prior Publication Data

US 2011/0078876 A1    Apr. 7, 2011

(30) Foreign Application Priority Data

Oct. 6, 2009    (KR) .................. 10-2009-0094830

(51) Int. Cl.
*E05F 1/08*    (2006.01)
(52) U.S. Cl. .......................... 16/303; 16/330
(58) Field of Classification Search .......... 16/297, 16/299, 335, 337, 339, 355, 357, 360, 374, 16/286, 303, 367; 361/679.08, 679.11, 679.02, 361/679.15, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | |
|---|---|---|---|
| 5,966,776 A * | 10/1999 | Ona | 16/328 |
| 6,886,221 B2 * | 5/2005 | Minami et al. | 16/324 |
| 7,117,562 B2 * | 10/2006 | Zuo et al. | 16/303 |
| 7,486,974 B2 * | 2/2009 | Pan | 455/575.3 |
| 7,513,010 B2 * | 4/2009 | Duan et al. | 16/330 |
| 2003/0040288 A1 * | 2/2003 | Kang et al. | 455/90 |
| 2005/0097705 A1 | 5/2005 | Chen | |
| 2005/0245294 A1 * | 11/2005 | Gupte et al. | 455/575.1 |
| 2005/0261041 A1 | 11/2005 | Im | |
| 2006/0080805 A1 | 4/2006 | Takagi | |
| 2008/0078062 A1 * | 4/2008 | Hsu et al. | 16/367 |
| 2009/0158555 A1 | 6/2009 | Liu | |
| 2010/0071159 A1 * | 3/2010 | Myung | 16/303 |
| 2010/0275413 A1 * | 11/2010 | Kim | 16/303 |

FOREIGN PATENT DOCUMENTS

| | | | |
|---|---|---|---|
| JP | 2006220198 A * | 8/2006 | |
| KR | 10-2004-0041909 A | 5/2004 | |
| KR | 10-2007-0024755 A | 3/2007 | |
| KR | 10-2009-0058623 A | 6/2009 | |
| WO | WO 2004059183 A1 * | 7/2004 | |

* cited by examiner

*Primary Examiner* — Chuck Y. Mah
(74) *Attorney, Agent, or Firm* — Schwegman, Lundberg & Woessner, P.A.

(57) ABSTRACT

A hinge device has first and second bodies. The second body is rotatable about the first body. The hinge device is connected to a first and second hinge arm. The hinge device includes a first hinge bracket having a first case portion inserted in the first hinge arm, and fixedly mounted to the first body; a second hinge bracket having a second case portion inserted in the second hinge arm, and fixedly mounted to the second body; a hinge shaft fitted in the first case portion, fixedly inserted in the second case portion; a bushing unit fixed to the first case portion, rotatably inserted in the second case portion, and adapted to limit a rotating range of the second body to the first body; and a hinge module disposed in the first case portion and transmitting driving torque to the second body when the second body rotates.

16 Claims, 8 Drawing Sheets

HINGE DEVICE FOR MOBILE DEVICE OF FOLDING TYPE

CROSS-REFERENCE TO RELATED APPLICATION

This application claims priority to and the benefit of Korean Patent Application No. 10-2009-0094830 filed in the Korean Intellectual Property Office on Oct. 6, 2009, the entire contents of which are incorporated herein by reference.

BACKGROUND OF THE INVENTION (a) Field of the Invention

The present invention relates to a mobile device of folding type. More particularly, the present invention relates to a hinge device for a mobile device of folding type in which a cover rotates with respect to a main body upwardly or downwardly.

(b) Description of the Related Art

In general, mobile devices, such as mobile phones, PDAs, laptops, and DMB phones, are widely used for wireless services such as broadcasting and communication in a mobile fashion.

The mobile device is becoming an important necessity for convenience in life with the development in the information industry, while mobile phones being are used by elementary school, middle school, and high school students to the old.

A variety of methods are used to open/shut a cover of the mobile devices, and they can be largely divided into a folding type, a slide type, and a swing type.

In particular, the covers of the mobile devices are opened/shut by being rotated with respect to a main body upwardly or downwardly in the folding type. Such mobile devices of the folding type have several advantages, such as convenient, robust, and refined design. Therefore, the folding type has been the most widely used in recent years.

In the mobile device of the folding type, a keypad is mounted at the main body and a display is mounted at the cover. When the cover faces the main body (that is, an angle between the cover and the mainbody is 0°), the cover is shut. If the cover rotates with respect to the main body upwardly, the cover is open.

Opening/shutting operations of the mobile device of the folding type are achieved by means of hinge devices, and manufacturers have recently manufactured the hinge devices having various structures.

Hinge devices for a mobile device of folding type according to conventional arts include a housing, a rotating cam, a movable cam, an elastic member, and a hinge shaft, and the cover of the mobile device can be opened/shut by interaction of these constituent elements.

According to the mobile device of folding type having such a hinge device, a pair of first hinge arms confronting each other is formed at both upper sides of one of the main body and the cover, and a second hinge arm is disposed between the first hinge arms at a middle portion of the other of the main body and the cover.

Herein, the hinge device is connected to any one of the first hinge arms and to one side of the second hinge arm, and a rotating shaft is mounted at the other of the first hinge arms and at the other side of the second hinge arm.

Since the hinge device, however, is connected to any one of the first hinge arms and the second hinge arm according to conventional arts, the second body fluctuates when the cover is open from the main body. Therefore, durability and reliability of the hinge device may be deteriorated. In addition, assembling processes of each component may be complex. Since the hinge device occupies large region at an engaging portion of the cover and the main body, it is difficult to reduce size of the mobile device.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hinge device for a mobile device of folding type having advantages of simple structure and simple assembling processes as a consequence that a hinge arm is formed as two parts.

A hinge device for a mobile device of folding type having a first body being a main body and a second body being a cover, wherein the second body is rotatable with respect to the first body upwardly or downwardly, and wherein the hinge device is connected to a first hinge arm formed at one side of an upper end of the first body and a second hinge arm at the other side of an upper end of the second body. The hinge device may include a first hinge bracket provided with a first case portion inserted in the first hinge arm, and fixedly mounted to the first body; a second hinge bracket provided with a second case portion inserted in the second hinge arm, and fixedly mounted to the second body; a hinge shaft fitted in the first case portion, inserted in the second case portion, stopped by an interior surface of the first case portion, and fixed to the second case portion by an engage unit; a bushing unit disposed between the first case portion and the second case portion, fixed to the interior surface of the first case portion, rotatably inserted in the second case portion, and formed of an stopper portion for limiting a rotating range of the second body to the first body; and a hinge module disposed in the first case portion and transmitting driving torque to the second body through the hinge shaft in a case that the second body rotates.

According to the hinge device for the mobile device of folding type, the hinge shaft may include an annular stopper protrusion protruded radially from one end portion of the hinge shaft; an engage hole formed at the other end portion of the hinge shaft; and a passing recess formed between both ends portion of the hinge shaft, a connector cable passing through the passing recess.

According to the hinge device for the mobile device of folding type, the first case portion may be formed of a stepped projection, by which the stopper protrusion is caught, at the interior surface thereof.

According to the hinge device for the mobile device of folding type, the bushing unit may include a first insert portion fitted in the first case portion; and a second insert portion fitted in the second case portion.

According to the hinge device for the mobile device of folding type, the stopper portion may be formed at a boundary portion of the first insert portion and the second insert portion.

According to the hinge device for the mobile device of folding type, the first insert portion may be provided with at least one engaging protrusion engaged with an engaging groove formed at the interior surface of the first case portion.

According to the hinge device for the mobile device of folding type, the first case portion may be provided with a first protrusion formed at an end confronting the second case portion.

According to the hinge device for the mobile device of folding type, the second case portion may be provided with a second protrusion formed at an end confronting the first case portion.

According to the hinge device for the mobile device of folding type, the stopper portion may be provided with a catching projection for limiting the rotating range of the second body, and the catching projection may be protruded as a rib along a circumferential direction at the boundary portion of the first and second insert portions.

According to the hinge device for the mobile device of folding type, the stopper portion may include a first rib formed at one side of the catching projection and receiving the first protrusion; and a second rib connected to the first rib through the catching projection, formed at the other side of the catching projection, receiving the second protrusion, and forming a corresponding trace to the rotating range of the second body.

According to the hinge device for the mobile device of folding type, the engage unit may include an insulator penetrating and fitted in the second case portion and the hinge shaft; and an engage bolt engaged to the insulator.

According to the hinge device for the mobile device of folding type, the first case portion may be formed of a first slit connected to the passing recess.

According to the hinge device for the mobile device of folding type, the second case portion may be formed of a second slit connected to the first slit.

According to the hinge device for the mobile device of folding type, the bushing unit may be formed of a third slit connected respectively to the first and second slits.

According to the hinge device for the mobile device of folding type, the hinge module may include a fixed cam inserted in and fixed to one end portion of the hinge shaft; a movable cam slidably engaged to the interior surface of the first case portion, and rotatably contacted to the fixed cam; a main spring mounted in the first case portion and applying elastic force to the movable cam; and a hook member engaged to the first case portion and supporting the main spring.

According to the hinge device for the mobile device of folding type, the hook member may include a hook body supporting the main spring; and a pair of hooks protruded from both sides of the hook body and engaged to the first case portion.

According to the hinge device for the mobile device of folding type, the fixed cam may be fitted in a mounting recess formed at one end portion of the hinge shaft.

According to the hinge device for the mobile device of folding type, the fixed cam may be provided with a pair of first fixing protrusions engaged to first fixing grooves formed at a bottom surface of the mounting recess and a pair of second fixing grooves engaged to second fixing protrusions formed at an interior surface of the mounting recess.

According to the hinge device for the mobile device of folding type, the fixed cam may be integrally formed of a rod portion fitted in the movable cam and engaged to the hook member.

According to the hinge device for the mobile device of folding type, the hinge module may further include a sub-spring mounted at the rod portion and applying elastic force to the movable cam.

The hinge device for the mobile device of folding type may further include a first bushing mounted in the second case portion and supporting the other end portion of the hinge shaft; and a second busing mounted at the one end portion of the hinge shaft and rotatably supporting the hinge shaft in the first case portion.

BRIEF DESCRIPTION OF THE DRAWINGS

The drawings illustrate exemplary embodiments of the present invention and are not construed to limit any aspect of the invention.

DESCRIPTION OF REFERENCE NUMERALS INDICATING PRIMARY ELEMENTS IN THE DRAWINGS

Figure 1:
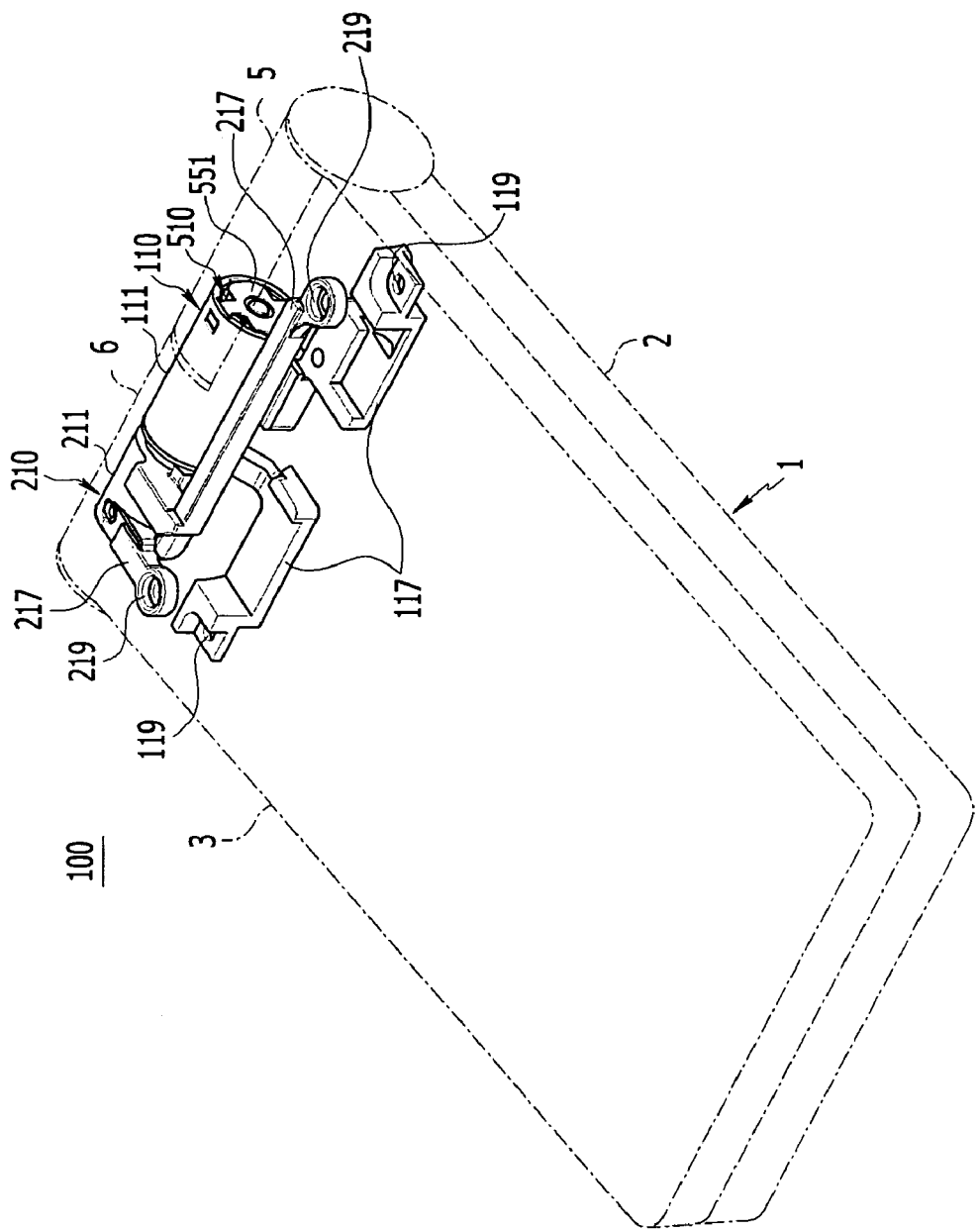
FIG. 1 and FIG. 2 are perspective views of a hinge device for a mobile device of folding type according to an exemplary embodiment of the present invention.

| 110 | first hinge bracket | 111 | first case portion |
|---|---|---|---|
| 210 | second hinge bracket | 211 | second case portion |
| 310 | hinge shaft | 311 | stopper protrusion |
| 313 | engage hole | 410 | bushing unit |
| 411 | first insert portion | 412 | second insert portion |
| 451 | stopper portion | 453 | catching projection |
| 461 | first rib | 471 | second rib |
| 510 | hinge module | 511 | fixed cam |
| 521 | movable cam | 531 | main spring |
| 541 | sub-spring | 551 | hook member |
| 910 | engage unit | 911 | insulator |
| 913 | engage bolt | | |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components which are not necessary for explaining the present invention will be omitted, and the same constituent elements are denoted by the same reference numerals in this specification.

In addition, size and thickness of components shown in the drawings may be differ from real size and real thickness of the components for better comprehension and ease of description.

Thickness of the components may be enlarged at many parts in the drawings for clear expression.

Figure 2:
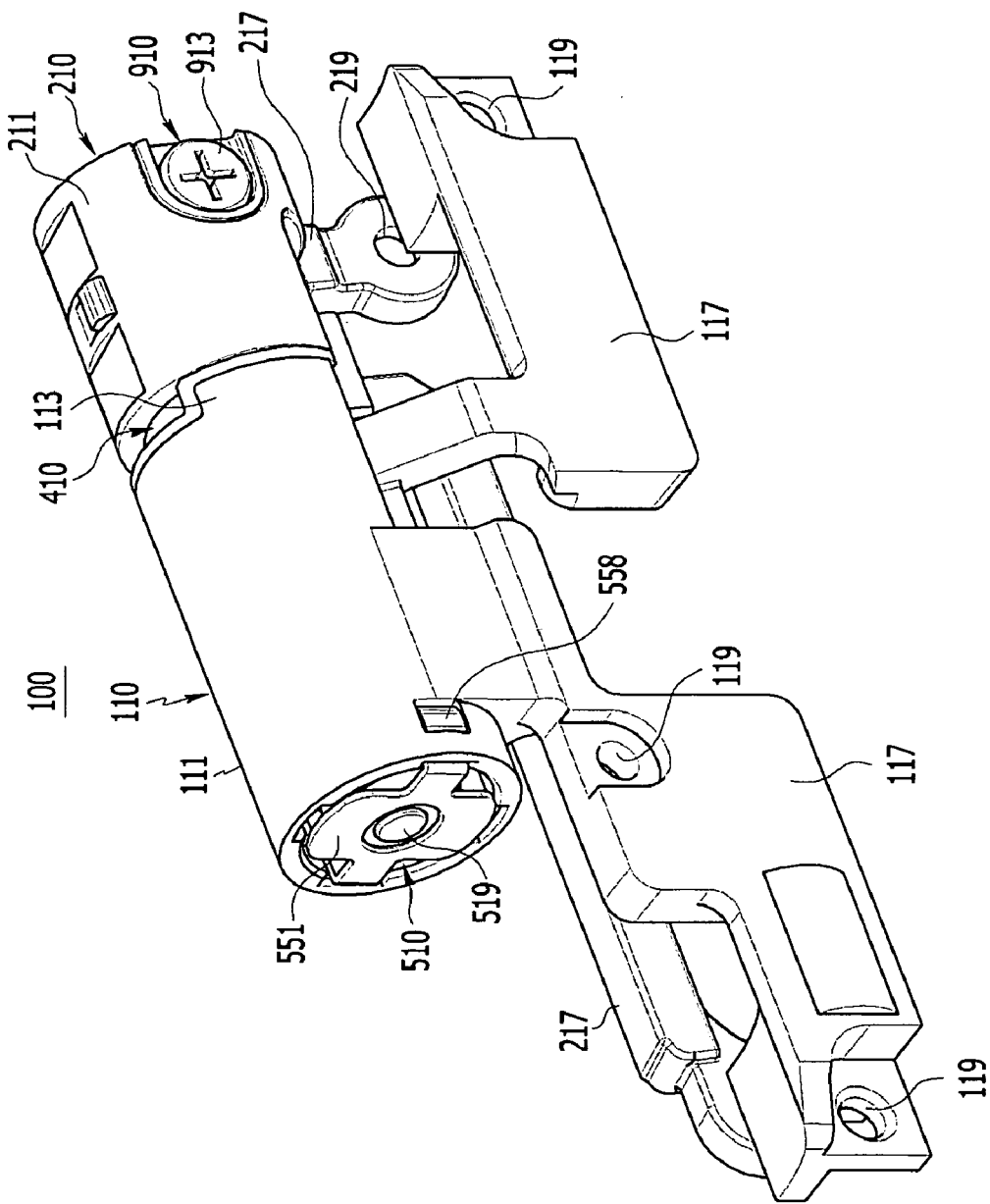
Figure 3:
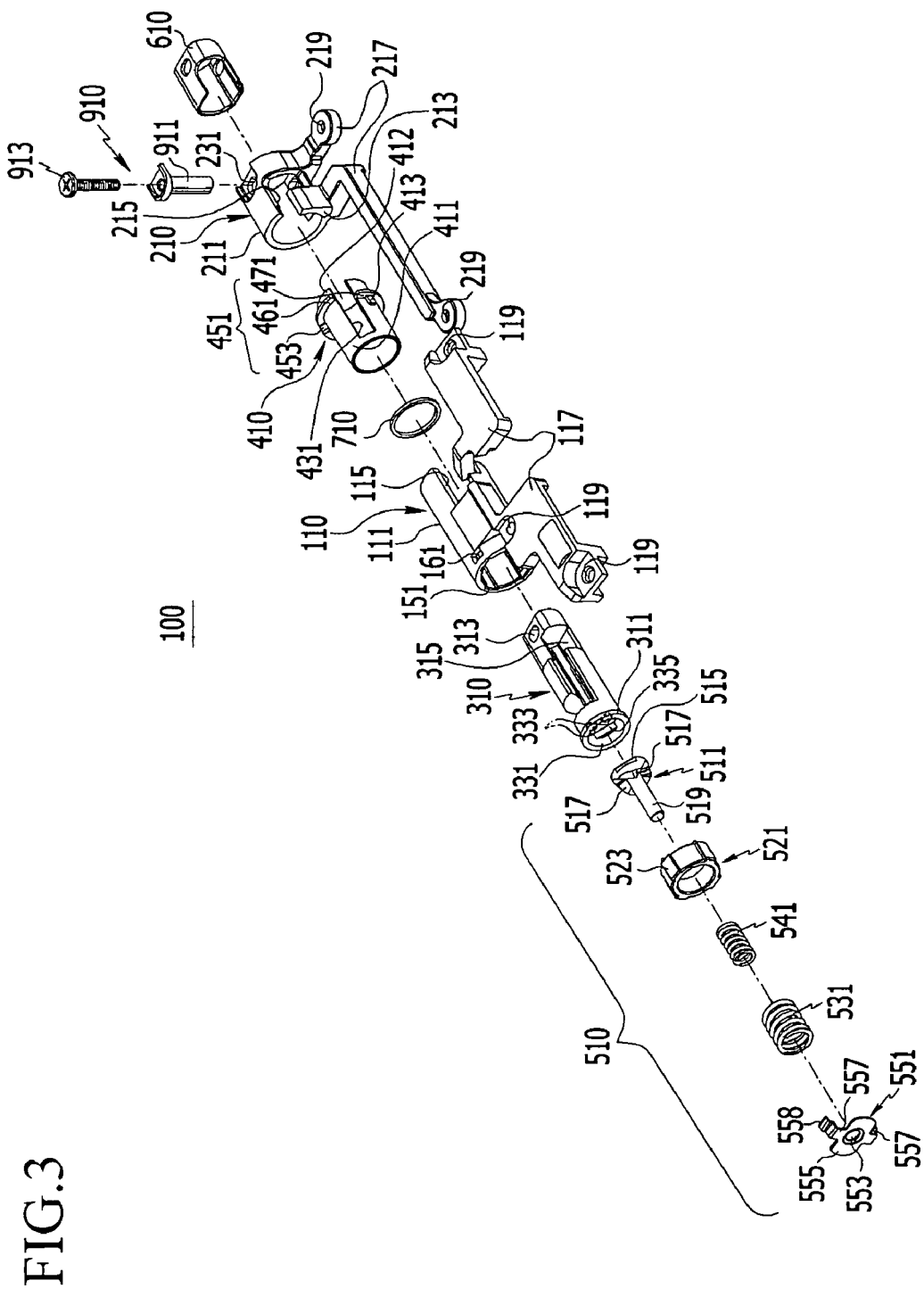
FIG. 3 and FIG. 4 are exploded perspective views of FIG. 2.
Figure 4:
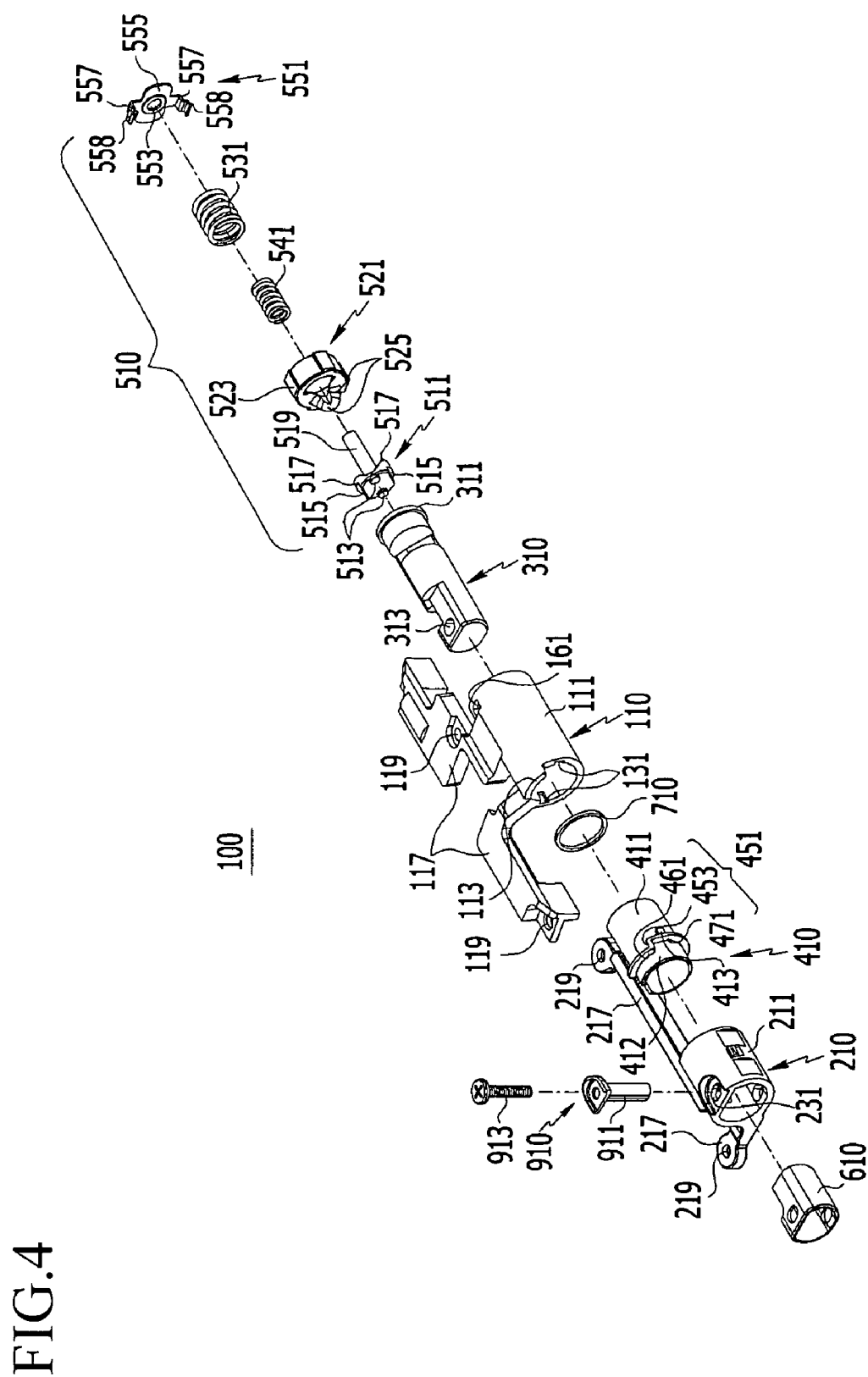
Figure 5:
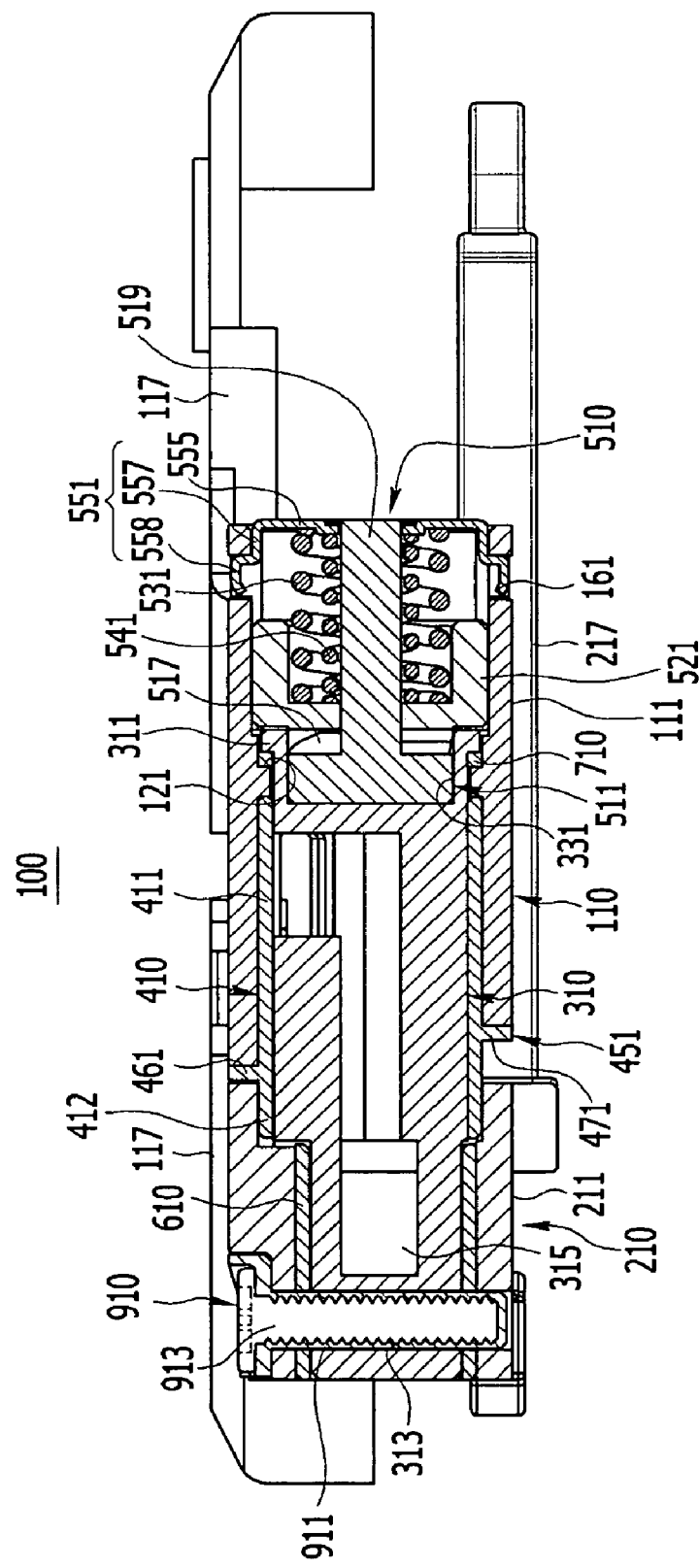
FIG. 5 is a cross-sectional view of FIG. 2.

FIG. 1 and FIG. 2 are perspective views of a hinge device for a mobile device of folding type according to an exemplary embodiment of the present invention; FIG. 3 and FIG. 4 are exploded perspective views of FIG. 2; and FIG. 5 is a cross-sectional view of FIG. 2.

Referring to the drawings, a mobile device 1 to which a hinge device 100 according to an exemplary embodiment of the present invention is applied is used for voice/video communication, transmitting messages, inputting data, watching DMB, watching video, or playing game.

Such a mobile device 1 includes a first body 2 which is a main body and a second body 3 which is a cover.

The mobile device 1 is a mobile device of folding type in which the second body 3 is opened/shut by being rotated with respect to the first body 2 upwardly or downwardly.

Herein, a keypad (not shown) is mounted at a front surface of the first body 2, and a display (not shown), such as a liquid crystal panel or a touch screen, is mounted at a front portion of the second body 3 according to the mobile device 1. The keypad of the first body 2 confronts the display of the second body 3.

In order to mount the hinge device 100 according to an exemplary embodiment of the present invention to the mobile device 1, a first hinge arm 5 is formed at the first body 2 and a second hinge arm 6 is formed at the second body 3.

The first hinge arm 5 is formed at one upper side (upper right side in FIG. 1) of the first body 2 and is formed along a width direction of the first body 2 with respect to a shut state of the first and second bodies 2 and 3 (an angle between the first and second bodies is 0°). Length of the first hinge arm 5 is substantially half of width of the first body 2.

In addition, the second hinge arm 6 is formed at the other upper side (upper left side in FIG. 1) of the second body 3 and is formed along a width direction of the second body 3 with respect to the shut state of the first and second bodies 2 and 3 (an angle between the firs and second bodies is 0°). Length of the second hinge arm 6 is substantially half of width of the second body 3.

Herein, the first and second hinge arms 5 and 6 are disposed coaxially, and have inner space. Confronting ends of the first and second hinge arms 5 and 6 are open.

Herein, the hinge device 100 according to an exemplary embodiment of the present invention used in a mobile phone as the mobile device 1 is exemplified, but can be applied to portable electric/electronic devices such as PDAs, PMPs, smart phones, handheld PCs, MP3/MP4 players, videogame consoles, netbooks, and laptops.

Such portable electric/electronic devices may have predetermined communication modules such as code division multiplexing access (CDMA) modules, bluetooth modules, infrared data association (IrDA) module, and wire/wireless LAN cards. Also, the portable electric/electronic devices may have predetermined microprocessors by which multi-media can be played.

Hereinafter, structures of the hinge device 100 applicable to the mobile device 1 of folding type will be described in detail.

Referring to the drawings, the first hinge arm 5 of the first body 2 is connected to the second hinge arm 6 of the second body 3 in the hinge device 100 for the mobile device of folding type according to an exemplary embodiment of the present invention.

The hinge device 100 basically includes a first hinge bracket 110, a second hinge bracket 210, a hinge shaft 310, a bushing unit 410, and a hinge module 510. The basic components will be described.

According to the present exemplary embodiment, the first hinge bracket 110 is mounted at the first hinge arm 5 of the first body 2 and is fixedly mounted to the first body 2.

The first hinge bracket 110 is integrally formed of a first case portion 111, which is fitted in the first hinge arm 5 and a part of which is fitted in the second hinge arm 6 of the second body 3. The first case portion 111 is formed of a hollow space case, both ends of which are open.

In this case, the first case portion 111 is provided with a first protrusion 113 protruded by a predetermined length from one end portion thereof confronting a second case portion 211 of the second hinge bracket 210.

In addition, a first slit 115 having a predetermined length is formed from one end portion to the other end portion of the first case portion 111.

Herein, the first hinge bracket 110 is provided with a pair of first engage arms 117 connected to the first case portion 111 and engaged to the first body 2.

The first engage arms 117 are integrally connected to the first case portion 111 and extends long to both sides of the first case portion 111. The first engage arm 117 is provided with a first bolt hole 119 to which a bolt is engaged.

According to the present exemplary embodiment, the second hinge bracket 210 is mounted at the second hinge arm 6 of the second body 3 and is fixedly mounted to the second body 3.

The second hinge bracket 210 is integrally formed of the second case portion 211 fitted in the second hinge arm 6. The second case portion 211 is formed of a hollow space case, both ends of which are open.

In this case, the second case portion 211 is provided with a second protrusion 213 protruded by a predetermined length from one end portion thereof confronting the first case portion 111 of the first hinge bracket 110.

In addition, a second slit 215 having a predetermined length and is connected to the first slit 115 is formed from one end portion to the other end portion of the second case portion 211.

Herein, the second hinge bracket 210 is provided with a pair of second engage arms 217 connected to the second case portion 211 and engaged to the second body 3.

The second engage arm 217 is integrally connected to the second case portion 211 and extends long to perpendicularly downward direction and to one side of the second case portion 211. The second engage arm 217 is provided with a second bolt hole 219 to which a bolt is engaged.

According to the present exemplary embodiment, the hinge shaft 310 connects the first hinge bracket 110 with the second hinge bracket 210 and supports relative rotation of the second body 3 to the first body 2.

The hinge shaft 310 has a predetermined length and has a rod shape. The hinge shaft 310 is inserted from the other end portion of the first case portion 111 in the first case portion 111, and is inserted from one end portion of the second case portion 211 in the second case portion 211.

The hinge shaft 310 is stopped by an interior surface of the first case portion 111, and is fixedly mounted to the second case portion 211 by an engage unit 910.

For this purpose, the hinge shaft 310 is formed of a stopper protrusion 311 which is stopped by the interior surface of the first case portion 111 at one end portion thereof. The stopper protrusion 311 has an annular shape which is radially protruded from the one end of the hinge shaft 310.

Since the hinge shaft 310 is stopped at the interior surface of the first case portion 111 by the stopper protrusion 311, a stepped projection 121, by which the stopper protrusion 311 is caught, is formed at the interior surface of the first case portion 111.

In addition, the hinge shaft 310 is provided with an engage hole 313 at the other end portion thereof so as to be engaged to the second case portion 211 through the engage unit 910.

Also, the hinge shaft 310 is provided with a passing recess 315 between both end portions thereof. A connector cable (not shown) electrically connected to electrical/electronic elements (not shown) of the first and second bodies 2 and 3.

Herein, the connector cable may be a flexible polychlorinated biphenyl (FPCB) cable or a micro coaxial cable (MCX), and the passing recess 315 is connected to the first slit 115 of the first case portion 111.

According to the present exemplary embodiment, the bushing unit 410 supports relative rotation of the first and second hinge brackets 110 and 210 according to the rotation of the second body 3 between the first case portion 111 of the first hinge bracket 110 and the second case portion 211 of the second hinge bracket 210.

The bushing unit 410 has a circular shape. The bushing unit 410 is fixed to the interior surface of the first case portion 111 and is rotatably inserted in the second case portion 211 between the first case portion 111 of the first hinge bracket 110 and the second case portion 211 of the second hinge bracket 210.

For this purpose, the bushing unit 410 includes a first insert portion 411 inserted in the first case portion 111 and a second insert portion 412 integrally connected to the first insert portion 411 and inserted in the second case portion 211.

The first insert portion 411 is inserted in the first case portion 111 between the first and second case portions 111 and 211 confronting each other, and is fixed to the interior surface of the first case portion 111.

Herein, the first insert portion 411 is provided with engaging protrusions 413 engaged with a pair of engaging grooves 131 which is formed at the interior surface of the first case portion 111. The pair of engaging protrusions 413 are formed at an exterior circumference of the first insert portion 411 with even space along a circumferential direction of the first injection portion 411.

In addition, the second insert portion 412 is inserted in the second case portion 211 between the first and second case portions 111 and 211 confronting each other, and is rotatably disposed in the second case portion 211 without any obstacle to rotation.

Also, the bushing unit 410 is provided with a third slit 431 connected to the first slit 115 of the first case portion 111 and the second slit 215 of the second case portion 211. The third slit 431 is formed from one end portion corresponding to the second case portion 211 to the other end portion.

According to the present exemplary embodiment, the bushing unit 410 includes a stopper portion 451 limiting rotating range of the second body 3 to the first body 2.

That is, when the second hinge bracket 210 rotates with respect to the first hinge bracket 110 according to the rotation of the second body 3, the stopper portion 451 limits the rotating range of the second hinge bracket 210 corresponding to the rotating range of the second body 3.

The stopper portion 451 is integrally formed with the first insert portion 411 and the second insert portion 412 at a boundary portion of the first insert portion 411 and the second insert portion 412 in the bushing unit 410.

The stopper portion 451 is provided with a catching projection 453 for limiting the rotating range of the second body 3 (that is, the second hinge bracket 210). The catching projection 453 is protruded as a rib along a circumferential direction at the boundary portion of the first and second insert portions 411 and 412.

More concretely, the stopper portion 451 is twisted up along the circumferential direction at the boundary portion of the first and second insert portions 411 and 412, and the catching projection 453 connects a start point of the stopper portion 451 to an end point of the stopper portion 451.

Such the stopper portion 451 includes a first rib 461 and a second rib 471. The first rib 461 is formed along the circumferential direction at one region of the boundary portion of the first and second insert portions 411 and 412, and receives the first protrusion 113 of the first case portion 111.

The second rib 471 is integrally connected to the first rib 461 through the catching projection 453, and is formed along the circumferential direction at the other region of the boundary portion of the first and second insert portions 411 and 412. In addition, the second rib 471 receives the second protrusion 213 of the second case portion 211, and forms a corresponding trace to the rotating range of the second body 3.

The engage unit 910 engages the other end portion of the hinge shaft 310 to the second case portion 211 of the second hinge bracket 210. The engaging unit 910 may be a wedge anchor which is well known to a person skilled in the art.

The engage unit 910 includes an insulator 911 and an engage bolt 913. In a state that the other end portion of the hinge shaft 310 is inserted in the second case portion 211 and the engage hole 313 formed at the other end portion of the hinge shaft 310 is aligned to a hole 231 formed at the second case portion 211, the insulator 911 penetrates and is fitted in the hole 231 and the engage hole 313.

In a case that the insulator 911 is fitted in the hole 211 of the second case portion 211 and the engage hole 313 of the hinge shaft 310, the engage bolt 913 is engaged to the insulator 911.

That is, as the engage bolt 913 is threaded to the insulator 911, the insulator 911 becomes closely contacted to interior circumferences of the hole 231 and the engage hole 313. Therefore, the hinge shaft 310 can be strongly engaged to the second case portion 211.

According to the present exemplary embodiment, the hinge module 510 transmits driving torque to the second body 3 through the hinge shaft 310 when the second body 3 rotates with respect to the first body 2. The hinge module 510 is disposed in the first case portion 111 of the first hinge bracket 110.

Such the hinge module 510 includes a fixed cam 511, a movable cam 521, a main spring 531, a sub-spring 541, and a hook member 551.

The fixed cam 511 is inserted and is fixedly mounted in one end portion of the hinge shaft 310. As the second body 3 rotates, the second hinge bracket 210 rotates and the hinge shaft 310 engaged to the second case portion 211 of the hinge bracket 210 also rotates. Therefore, the fixed cam 511 may be called a rotating cam.

The fixed cam 511 is fitted in a mounting recess 331 formed at one end portion of the hinge shaft 310 and is fixedly mounted in the mounting recess 331.

For this purpose, the fixed cam 511 is provided with a pair of first fixing protrusions 513 engaged to a first fixing groove 333 formed at a bottom surface of the mounting recess 331. The circular first fixing protrusion 513 is protruded from one side surface of the fixed cam 511 and is fitted to the first fixing groove 333 in the mounting recess 331.

In addition, the fixed cam 511 is provided with a pair of second fixing groove 515 engaged to a second fixing protrusion 335 formed at an interior surface of the mounting recess 331. The second fixing groove 515 is formed at an exterior circumference of the fixed cam 511.

Also, a pair of the first cam protrusions 517 is formed with even space at the other side surface of the fixed cam 511. A rod portion 519 is integrally protruded at the other side surface of the fixed cam 511 by a predetermined length.

The movable cam 521 is disposed in the first case portion 111, and is slidably engaged to the interior surface of the first case portion 111. The fixed cam 511 is inserted in the movable cam 521.

For this purpose, a plurality of slide protrusions 523 is formed at an exterior circumference of the movable cam 521 along a length direction of the first case portion 111. In addition, a slide rail 151 corresponding to the slide protrusion 523 is formed at the interior surface of the first case portion 111. The slide rail 151 is slidably engaged with the slide protrusion 523.

Also, the movable cam 521 is provided with a pair of second cam protrusions 525 rotatably contacted to the first cam protrusions 517 at a corresponding surface to the first cam protrusions 517 of the fixed cam 511. The second cam protrusion 525 is formed circumferentially with even space around a hole in which the rod portion 519 of the fixed cam 511 is inserted.

The main spring 531 applies elastic force to the movable cam 521 in the first case portion 111. In a state that the rod portion 519 of the fixed cam 511 is inserted in the movable cam 521, the main spring 531 is mounted on the rod portion 519.

The main spring 531 may be a coil spring coiling the rod portion 519 and supported by the movable cam 521. One end of the main spring 531 is supported by a hook member 551 and the other end of the main spring 531 is supported by the movable cam 521.

The sub-spring 541 assists the main spring 531 and applies elastic force to the movable cam 521 in the first case portion 111. The sub-spring 541 is mounted on the rod portion 519 of the fixed cam 511 inside the main spring 531, and may be a coil spring. One end of the sub-spring 541 is supported by the hook member 551 and the other end of the sub-spring 541 is supported by the movable cam 521.

The hook member 551 is engaged to the other end of the first case portion 111 in the first hinge bracket 110, and supports the main spring 531 and the sub-spring 541.

The hook member 551 includes a hook body 555 supporting the main spring 531 and the sub-spring 541 and a pair of hooks 557 protruded from both sides of the hook body 555 and engaged to the first case portion 111.

The hook body 555 is provided with an insert hole 553 formed at a middle portion thereof, and the rod portion 519 of the fixed cam 511 is inserted in the insert hole 553.

In addition, the hooks 557 are extended radially from both sides of the hook body 555, and then are bent toward the first case portion 111. Hook protrusions 558 engaged to the first case portion 111 are formed at the hooks 557.

In order to engage the hooks 557 to the first case portion 111, hook holes 161 engaged to respective hook protrusions 558 of the hooks 557 are formed at the first case portion 111.

In the drawings, reference numeral 610 represents a first bushing mounted in the second case portion 211 and supporting the other end portion of the hinge shaft 310, and reference numeral 710 represents a second busing mounted at the one end portion of the hinge shaft 310 and rotatably supporting the hinge shaft 310 in the first case portion 111.

Hereinafter, an operation of the hinge device 100 for the mobile device of folding type according to an exemplary embodiment of the present invention will be described in detail wither reference to the accompanying drawings.

According to the present exemplary embodiment, let's assume that the mobile device 1 is in a close mode where the first body 2 confronts the second body 3 (an angle between the first body 2 and the second body 3 is 0°.

Figure 6A:
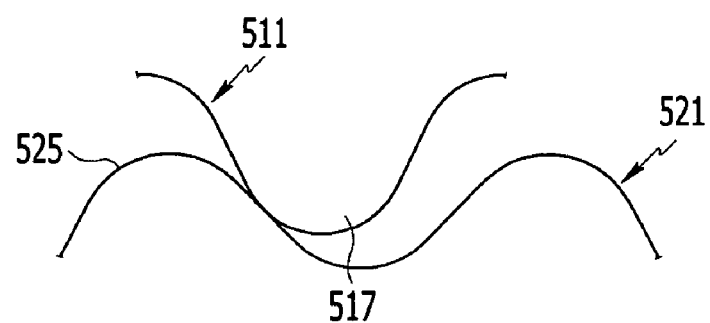
FIG. 6A to FIG. 6E show operation of a hinge device for a mobile device of folding type according to an exemplary embodiment of the present invention.

In the close mode, the first cam protrusion 517 of the fixed cam 511 is closely contacted to a slanted region of the second cam protrusion 525 of the movable cam 521, as shown in FIG. 6A.

Therefore, the fixed cam 511 applies torque such that the first cam protrusion 517 is engaged to the second cam protrusion 525 by the elastic force of the main spring 531 and the sub-spring 541.

Therefore, as the torque is applied to the fixed cam 511 so as to close the second body 3, the second body 3 of the cover applies a predetermined preload to the first body 2 in the close mode.

This preload prevent the second body 3 from being open from the first body 2 by gravity if a position of the mobile device 1 changes in a state that the first body 2 confronting the second body 3. Therefore, marketability of the mobile device 1 may be maximized.

If the second body 3 is rotated upwardly by a predetermined angle in a close mode, the second hinge bracket 210 rotates together with the second body 3. In addition, the hinge shaft 310 engaged to the second case portion 211 of the hinge bracket 210 also rotates, and the fixed cam 511 rotates together with the hinge shaft 310.

Figure 6B:
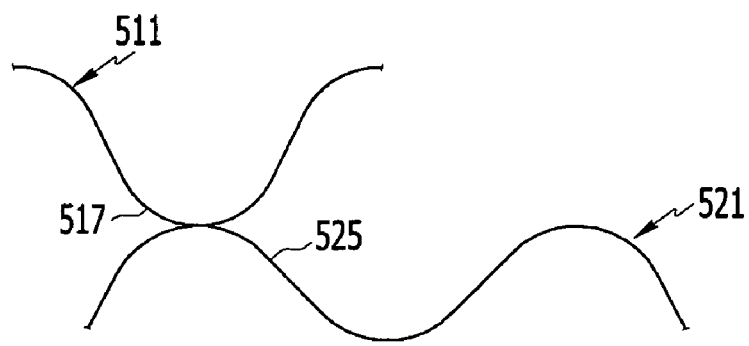

The first cam protrusion 517 of the fixed cam 511 slides along the slanted region of the second cam protrusion 525 in a state of being closely contacted to the slanted region of the second cam protrusion 525 of the movable cam 521, and arrives at an inflection point of the second cam protrusion 525, as shown in FIG. 6B.

Figure 6C:
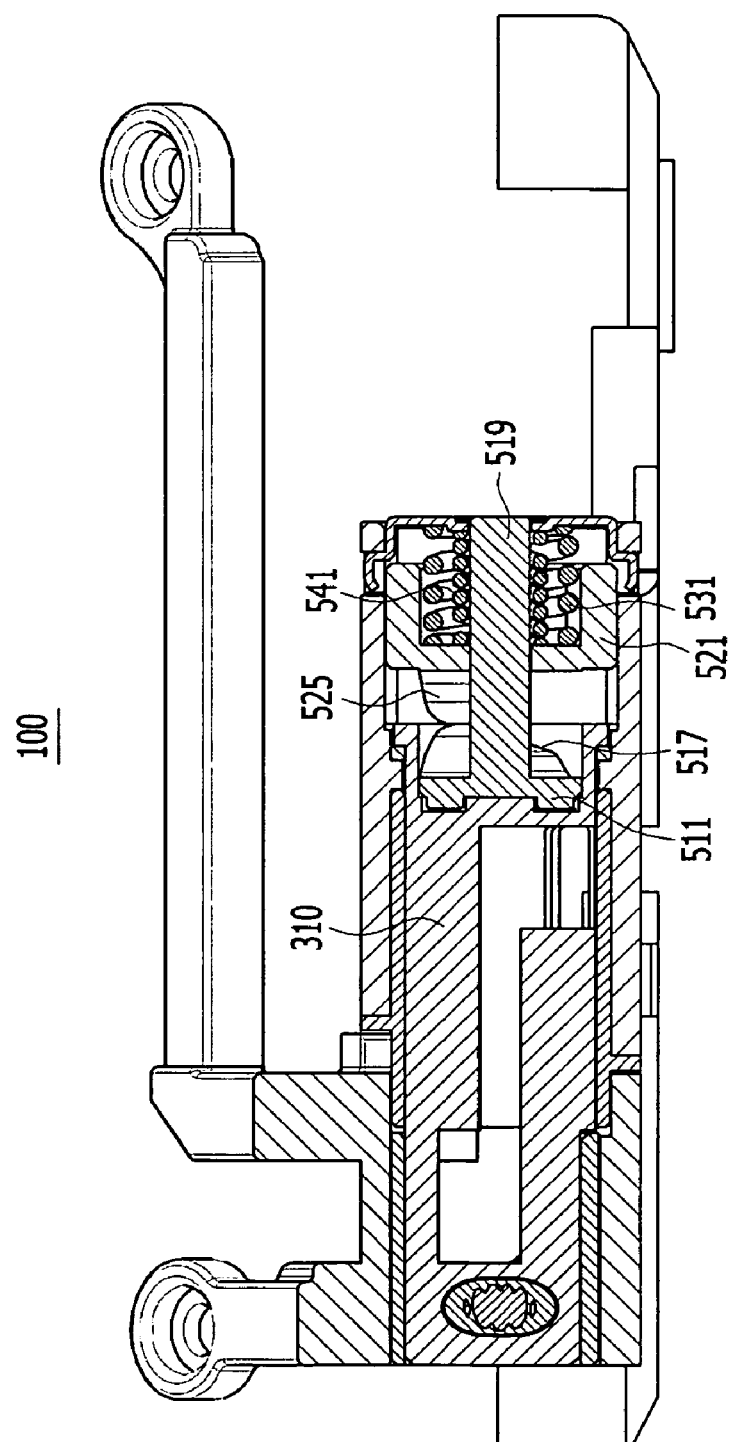

The first cam protrusion 517 of the fixed cam 511 pushes the movable cam 521 until the first cam protrusion 517 arrives at the inflection point of the second cam protrusion 525. Therefore, the movable cam 521 compresses the main spring 531 and the sub-spring 541, and moves along the rod portion 519 of the fixed cam 511, as shown in FIG. 6C.

If a user exerts more force upwardly to the second body 3 at this state, the hinge shaft 310 rotates further and the first cam protrusion 517 of the fixed cam 511 is escaped from the inflection point of the second cam protrusion 525.

Figure 6D:
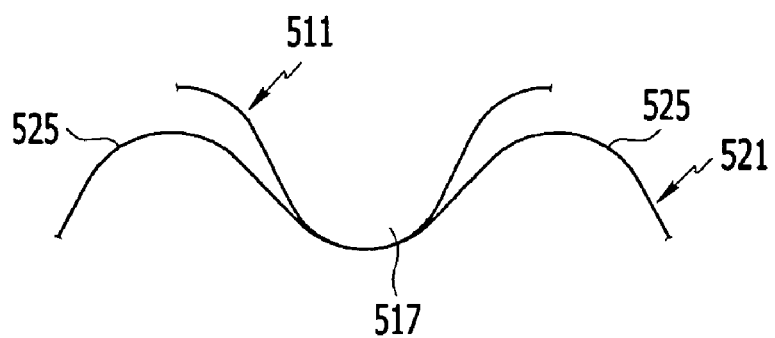

At that time, the first cam protrusion 517 slides along a slanted region of the second cam protrusion 525 by the elastic restoring force of the springs 531 and 541 in a state of being closely contacted to the slanted region of the second cam protrusion 525. After that, the first cam protrusion 517 is engaged to a concave portion between the second cam protrusions 525 (referring to FIG. 6D).

At this state, the elastic restoring force of the main spring 531 and the sub-spring 541 is operated as driving torque by which the hinge shaft 310 is rotated through the fixed cam 511, and the movable cam 521 is returned to its original position by the elastic restoring force of the springs 531 and 541.

Therefore, the fixed cam 511 receives the elastic restoring force of the springs 531 and 541 as the driving torque. Since the fixed cam 511 is fixed to the hinge shaft 310, the hinge shaft 310 is rotated by the driving torque of the fixed cam 511.

Resultantly, as the hinge shaft 310 is rotated upwardly by the elastic restoring force of the springs 531 and 541, the second body 3 is completely open by a predetermined angle with respect to the first body 2.

Figure 6E:
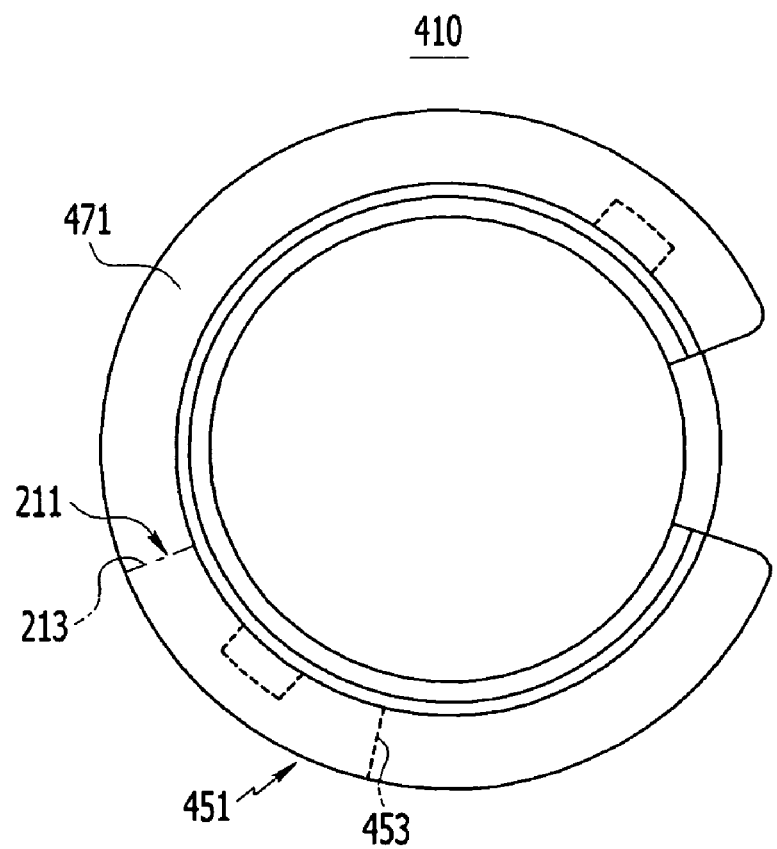

Meanwhile, the rotating range of the second body 3 is limited by the stopper portion 451 of the bushing unit 410 according to the present exemplary embodiment. When the second body 3 rotates upwardly, the second protrusion 213 of the second case portion 211 moves along the rotating trace of the second rib 471 on the stopper portion 451 and is stopped by the catching projection 453, as shown in FIG. 6E.

In this exemplary embodiment, closing the second body 3 that is open from the first body 2 is achieved in the inverse order of the above operation, and thus detailed description thereof will be omitted.

Since the hinge device 100 for the mobile device of folding type according to an exemplary embodiment of the present invention includes the first hinge arm 5 of the first body 2 and the second hinge arm 6 of the second body 3 connected to each other, fluctuation of the second body 3 occurring when the second body 3 is closed to or is open from the first body 2 may be notably reduced, assembling work of the hinge device 100 may be simple, and size of the mobile device 1 may get smaller.

Since the stopper portion 451 for limiting the rotating range of the second body 3 to the first body 2 is provided in the bushing unit 410 for supporting rotation of the first and second hinge brackets 110 and 210 according to the present exemplary embodiment, limiting means for limiting the rotating range is not mounted at the hinge brackets 110 and 210 and the hinge shaft 310. Therefore, cost for manufacturing each component may be reduced and processes for manufacturing each component may become simple.

Since the first and second hinge brackets 110 and 210 are connected through the hinge shaft 310 and the hinge shaft 310 is engaged through the engage unit 910 according to the present exemplary embodiment, assembling processes may be simplified and durability and reliability of the hinge device 100 may improve.

Since the hinge shaft 310 has a rod shape according to the present exemplary embodiment, robust design of the hinge device 100 may be achieved. In addition, since the hinge module 510 is mounted at the first case portion 111 by the hook member 551 engaged to the first case portion 111, mounting process of the hinge module 510 such as cams and springs may be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hinge device for a mobile device of folding type having a first body being a main body and provided with a first hinge arm formed at one side of an upper end of the first body, and a second body being a cover and provided with a second hinge arm formed at the other side of an upper end of the second body, the second body being rotatable with respect to the first body upwardly or downwardly, the hinge device comprising:
a first hinge bracket provided with a first case portion inserted in the first hinge arm, and fixedly mounted to the first body;
a second hinge bracket provided with a second case portion inserted in the second hinge arm, and fixedly mounted to the second body;
a hinge shaft fitted in the first case portion, inserted in the second case portion, and fixed to the second case portion by an engage unit, the first case portion being rotatable with respect to the second case portion by a predetermined angle through the hinge shaft rotating;
a bushing unit disposed between the first case portion and the second case portion, fixed to an interior surface of the first case portion, rotatably inserted in the second case portion, and formed of a stopper portion for limiting a rotating range of the second body to the first body; and
a hinge module disposed in the first case portion and transmitting driving torque to the second body through the hinge shaft in a case that the second body rotates.

2. The hinge device of claim 1, wherein the hinge shaft comprises:
an annular stopper protrusion protruded radially from one end portion of the hinge shaft;
an engage hole formed at the other end portion of the hinge shaft; and
a passing recess formed between both ends portion of the hinge shaft, a connector cable passing through the passing recess.

3. The hinge device of claim 2, wherein the first case portion is formed of a stepped projection, by which the stopper protrusion is caught, at the interior surface of the first case portion.

4. The hinge device of claim 2, wherein the first case portion is formed of a first slit connected to the passing recess, the second case portion is formed of a second slit connected to the first slit, and the bushing unit is formed of a third slit connected respectively to the first and second slits.

5. The hinge device of claim 1, wherein the bushing unit comprises:
a first insert portion fitted in the first case portion; and
a second insert portion fitted in the second case portion,
wherein the stopper portion is formed at a boundary portion of the first insert portion and the second insert portion.

6. The hinge device of claim 5, wherein the first insert portion is provided with at least one engaging protrusion engaged with an engaging groove formed at the interior surface of the first case portion.

7. The hinge device of claim 5, wherein the stopper portion is provided with a catching projection for limiting the rotating range of the second body, and the catching projection is protruded as a rib along a circumferential direction at the boundary portion of the first and second insert portions.

8. The hinge device of claim 7, wherein the stopper portion comprises:
a first rib formed at one side of the catching projection and receiving the first protrusion; and
a second rib connected to the first rib through the catching projection, formed at the other side of the catching projection, receiving the second protrusion, and forming a corresponding trace to the rotating range of the second body.

9. The hinge device of claim 1, wherein the first case portion is provided with a first protrusion formed at an end confronting the second case portion, and the second case portion is provided with a second protrusion formed at an end confronting the first case portion.

10. The hinge device of claim 1, wherein the engage unit comprises:
an insulator penetrating and fitted in the second case portion and the hinge shaft; and
an engage bolt engaged to the insulator.

11. The hinge device of claim 1, wherein the hinge module comprises:
a fixed cam inserted in and fixed to one end portion of the hinge shaft;
a movable cam slidably engaged to the interior surface of the first case portion, and rotatably contacted to the fixed cam;
a main spring mounted in the first case portion and applying elastic force to the movable cam; and
a hook member engaged to the first case portion and supporting the main spring.

12. The hinge device of claim 11, wherein the hook member comprises:
a hook body supporting the main spring; and
a pair of hooks protruded from both sides of the hook body and engaged to the first case portion.

13. The hinge device of claim 11, wherein the fixed cam is fitted in a mounting recess formed at one end portion of the hinge shaft, and is provided with a pair of first fixing protrusions engaged to first fixing grooves formed at a bottom surface of the mounting recess and a pair of second fixing grooves engaged to second fixing protrusions formed at an interior surface of the mounting recess.

14. The hinge device of claim 11, wherein the fixed cam is integrally formed of a rod portion fitted in the movable cam and engaged to the hook member.

15. The hinge device of claim 14, wherein the hinge module further comprises a sub-spring mounted at the rod portion and applying elastic force to the movable cam.

16. The hinge device of claim 1, further comprising:
a first bushing mounted in the second case portion and supporting the other end portion of the hinge shaft; and
a second busing mounted at the one end portion of the hinge shaft and rotatably supporting the hinge shaft in the first case portion.

* * * * *